United States Patent [19]

Chapman et al.

[11] Patent Number: 5,116,902
[45] Date of Patent: May 26, 1992

[54] ELASTOMER FOR USE WITH AQUEOUS INKS

[75] Inventors: Charles B. Chapman, San Diego, Calif.; Michael R. Williams, Brooklyn Park, Minn.

[73] Assignees: Hewlett-Packard Company, Palo Alto, Calif.; Hiawatha Rubber Co., Brooklyn Park, Minn.

[21] Appl. No.: 472,157

[22] Filed: Jan. 30, 1990

[51] Int. Cl.$^5$ .............................................. C08K 3/04
[52] U.S. Cl. ..................... 524/579; 525/331.7; 524/441; 524/484; 524/486; 524/490; 524/491
[58] Field of Search ............... 525/331.7; 524/441, 524/484, 486, 490, 491, 579

[56] References Cited

U.S. PATENT DOCUMENTS 4,645,791 2/1987 Theodore et al. ............... 524/490

*Primary Examiner*—Paul R. Michl
*Assistant Examiner*—John J. Guarriello

[57] ABSTRACT

In ink-jet pens (10) for use with printers and plotters, an elastomeric, back-pressure bladder (12) is employed to ensure a supply of ink (14) to the printhead (16) under substantially constant pressure. Contamination of ink due to solubilization of components in the bladder by the aqueous-based ink is avoided by employing an elastomer composition essentially of a high cross-link density ethylene propylene diene monomer, carbon black as reinforcement, dicumyl peroxide on Kaolin clay as curative, and fully hydrogenated clay filtered mineral oil as plasticizer. Such elastomers are given by the composition range (in parts per hundred):

| | |
|---|---|
| EPDM resin | 100 |
| Carbon black | 18 to 30 |
| Curative | 7.0 to 7.5 |
| Plasticizer | 20 to 25. |

6 Claims, 1 Drawing Sheet

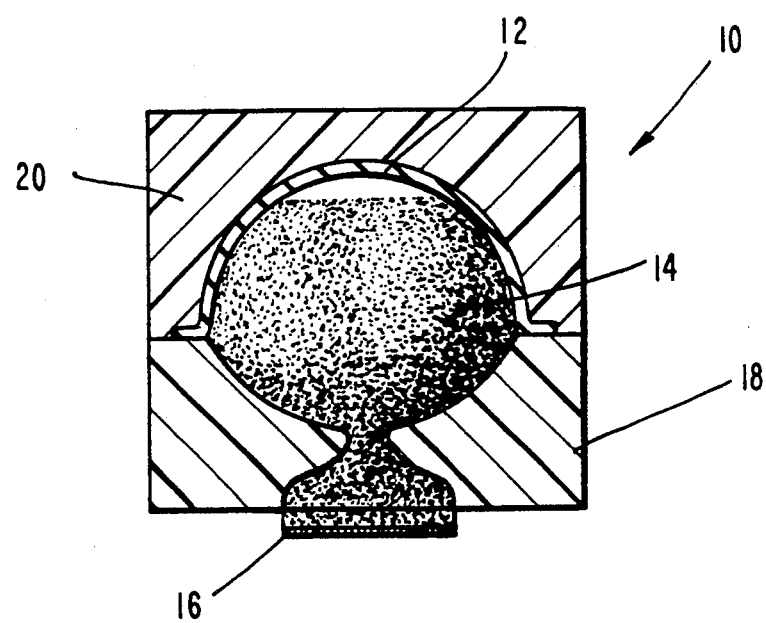

3
ELASTOMER FOR USE WITH AQUEOUS INKS

TECHNICAL FIELD

The present invention relates to ink-jet printers and plotters and to the aqueous-based inks used therein. More particularly, the present invention is related to elastomeric materials used in connection with containing and dispensing such inks.

BACKGROUND ART

Many ink-jet printers employ as a supply of ink a cartridge which serves as a reservoir of ink and which also provides direct fluid communication to a printhead assembly on the cartridge for jetting droplets of ink toward a print medium, such as paper. It is important to provide a constant negative pressure to the ink to resist the flow of ink through the nozzles in the printhead.

Plotters employing the ink-jet principle often require a supply of ink that exceed that available in cartridge form. An example of means for storing a supply of ink is disclosed and claimed in U.S. Pat. No. 4,714,937, issued to George Kaplinsky and assigned to the same assignee as this application. Briefly, a reservoir of ink is used to refill a bladder, which collapses as the ink is consumed. The collapsing bladder, which comprises an elastomeric material, exerts the desired negative, or back, pressure during collapse to prevent the ink contents from draining out except upon demand. When the bladder is substantially emptied, it is refilled from the reservoir.

In cartridges used in printers and in bladders used in plotters, it has been determined that the material used to fabricate the cartridge or bladder is crucial to the operation of the pen. Specifically, many elastomer formulations used in such cartridges and bladders are found to contain soluble or partially soluble components that dissolve in aqueous-based inks. Such soluble or partially soluble components contaminate the ink and may affect ink properties and cause aberrant printing behavior. Properties that may change include surface tension, viscosity, and pH. Further, as ink extracts materials from the bladder, or otherwise attacks the elastomer, the bladder characteristics will change, resulting in a back-pressure variation that may be unacceptable. Finally, water loss through the bladder membrane is an important consideration. If the water content of the ink drops, then the ink will deliver non-optimal performance in several areas, including color, crusting time, viscosity, and surface tension.

Thus, there is a need to provide an elastomeric material which does not contaminate aqueous-based inks used in ink-jet printing and which minimizes loss of water from the ink.

DISCLOSURE OF INVENTION

In accordance with the invention, an elastomer composition is provided which is substantially impervious to attack by aqueous-based inks used in ink-jet printing and which resists water loss. The elastomer composition consists essentially of a high cross-link density ethylene propylene diene monomer (EPDM), carbon black as reinforcement, dicumyl peroxide on Kaolin clay as curative, and fully hydrogenated clay filtered mineral oil as plasticizer. The concentration ranges of each ingredient in parts per hundred resin (phr) are:

| EPDM resin | 100 |
|---|---|
| Carbon black | 18 to 30 |
| Curative | 7.0 to 7.5 |
| Plasticizer | 20 to 25. |

The foregoing composition is useful not only in printer cartridges and plotter bladders, but also in fluid-tight gaskets exposed to the ink used in ink-jet printing.

Aqueous-based inks used in conjunction with the above-indicated elastomer composition include water plus dye and, optionally, one or more of the glycols and glycol ethers commonly employed in ink-jet printing, together with other optional ingredients, such as biocides, pH buffers, surfactants, and the like.

The elastomer composition of the invention evidences substantially no contamination from such aqueous-based inks over the lifetime of the pen, as determined by direct chemical analysis and indirect means (system testing).

BRIEF DESCRIPTION OF THE DRAWINGS

The sole Figure depicts, in cross-section, an example of a pen comprising a bladder/reservoir for exerting back pressure on the ink and a printhead.

BEST MODES FOR CARRYING OUT THE INVENTION

Turning now to the Figure, a disposable bladder pen 10, such as used in ink-jet printers and plotters, comprises a deformable, collapsible enclosure 12 for storing and delivering a quantity of ink 14 at a prescribed delivery pressure and an ink-jet printhead 16. The pen is mounted in a pen body 18, so the ink-jet printhead 16 includes a nozzle plate (not shown) with a multiplicity of orifices (not shown) for the ejection of ink droplets.

The foregoing description is of one configuration of a simple disposable bladder pen. It will be appreciated that there are many possible configurations employing such a bladder and that more complex pens may employ an elastomeric, collapsible ink bladder which is supplied from a separate reservoir. All such pens using elastic bladders are considered to fall within the scope of the invention.

The ink bladder 12 may be so configured that it collapses in an axi-symmetric manner as ink is consumed by the ink-jet printhead 16. However, axi-symmetric collapse is not necessary for such bladders to work.

In accordance with the invention, an elastomer composition, which is used to construct the ink bladder 12, is provided which is substantially impervious to attack by aqueous-based inks used in ink-jet printing and which resists water loss. The elastomer composition consists essentially of a high cross-link density ethylene propylene diene monomer (EPDM), carbon black as reinforcement, dicumyl peroxide on Kaolin clay as curative, and fully hydrogenated clay filtered mineral oil as plasticizer. The concentration ranges of each ingredient are:

| EPDM resin | 100 |
|---|---|
| Carbon black | 18 to 30 |
| Curative | 7.0 to 7.5 |
| Plasticizer | 20 to 25. |

Preferably, the formula comprises

| | |
|---|---|
| EPDM resin | 100 |
| Carbon black | 30 |
| Curative | 7.0 |
| Plasticizer | 25 | and maximizes two competing considerations: low hardness and high tear strength.

The ethylene-propylene resin preferably has a high ethylene content and randomly distributed monomer units, which provides high resilience of the elastomer.

The elastomer compositions of the invention are prepared by combining the ingredients to homogeneity on a two-roll mill. The prepared elastomer is then ready for use in transfer or compression molding. Conventional process times and temperatures are employed.

The elastomer composition of the invention is fabricated into a suitable shape for use as a bladder. A hemispherical shape is often used, although the bladders of the invention are not limited to such shapes. Gaskets may also be fabricated from the elastomer; such gaskets are fluid-tight to the ink.

The advantage of the elastomer of the invention is that it evidences very low compression set due to the high cross-link density. As is well-known, a low compression set means that the memory of the material for its original shape is very good. It is this memory for its original shape (the tendency of the material to return to the original configuration, regardless of the present configuration) that generates the desired back-pressure under all anticipated conditions of use.

In addition, the resilience properties are empirically matched to the hemispherical bladder such that back-pressure as a function of fluid withdrawn is essentially flat. Resilience, as used herein, is a measure of the rate at which the elastomer tries to restore itself to its original state. It is a measure of "liveliness".

Aqueous-based inks used in conjunction with the above-indicated elastomer composition include water plus dye and, optionally, one or more of the glycols and glycol ethers commonly employed in ink-jet printing, together with other optional ingredients, such as biocides, pH buffers, surfactants, and the like.

The elastomer of the invention has essentially no extractables which are soluble in the ink to change ink performance or affect printhead life. As a result, the elastomer compositions of the invention evidence substantially no contamination from such aqueous-based inks over the life-time of the pen, as determined by direct chemical analysis and indirect means (system testing). Ink contamination testing is done primarily in vitro; the various elastomeric compounds are placed in vessels containing ink (and sometimes dye) and soaked at elevated temperatures (to stimulate extraction of contaminants). After the test, the elastomers and the ink samples are examined. The ink properties of pH, surface tension, viscosity and composition are checked. The elastomer is examined visually for signs of degradation and its hardness is tested for changes.

Finally, the elastomer of the invention resists diffusion of water through the bladder walls because of its extremely hydrophobic nature. The water vapor transmission rate (in grams/2000 mm$^2$/month) is as follows:

| Wall thickness | 23° C. | 45° C. | 65° C. |
|---|---|---|---|
| 0.024 inch | 0.063 | 0.849 | 2.088 |
| 0.030 inch | 0.047 | 0.630 | 1.512 |

INDUSTRIAL APPLICATION

The elastomer composition of the invention is expected to find use in ink-jet pens, particularly used in printers, plotters, copiers, facsimile machines, etc.

EXAMPLES

A series of elastomer compositions were prepared having compositions in the following range:

| Ingredient | Amount (phr) |
|---|---|
| EPDM resin | 100 |
| Carbon black | 5-20 |
| Curative | 5.75-7.5 |
| Mineral oil | 0-25. |

The EPDM resin was obtained from Polysar, Ltd. (Sarnia, Ontario, Canada), available under the trade designation 585. The carbon black was obtained from RT Vanderbilt (Norwalk, Conn.) under the trade designation Floform N990. The mineral oil was obtained from Witco Chemical Corporation (New York, N.Y.) under the trade designation Kaydol. The curative was obtained from RT Vanderbilt under the trade designation Varox DCP-40KE.

Test pieces were molded using conventional rubber compression molding process parameters and exposed to ink vehicle for four to eight weeks at 65° C. to stimulate interactions between the rubber and the ink vehicle.

For comparison, a number of other resins were used in place of the EPDM (Polysar, Ltd.): butyl rubber blend, epichlorhydrin, polyacrylic, nitrile (Minnesota Rubber Company), fluorocarbon elastomer, EPDM (Minnesota Rubber Company), neoprene, chlorosulfonated rubber (DuPont Hypalon), and nitrile (Kirkhill Rubber Co.).

In the comparative test, the ink vehicle was 50% diethylene glycol and 50% deionized water. The elastomer samples were measured before and after the test for the following properties: hardness (Shore A scale), water absorption (% weight), and visual appearance (discoloration, precipitates, blisters, swelling, curling, etc.).

The ink vehicle was tested for changes in the following key properties: viscosity ($v$), surface tension ($\sigma$), pH, and visual appearance.

Additionally, water vapor transmission tests were conducted in accordance with ASTM D-814-81 "Rubber Property: Vapor Transmission of Volatile Liquids". The ability of the material to contain aqueous liquids without water loss is crucial, since ink composition changes due to water loss would adversely affect pen performance.

A Table of key results is presented below. These data show the change in property from its original value to its final value after a four-week soak in the afore-mentioned ink vehicle at 65° C.

It is noted that surface tension is a very sensitive indicator of organic contamination and hence was given a relatively high weighting. Also, visual appearance was given a higher than average weighting because of the large differences visible between a rank of "10" (the worst) versus a rank of "1" (the best). The calculated maximum allowable loss factor was 2.0 and hence, any elastomer with a loss factor greater than 2.0 is unacceptable.

|   | Sample and Code | Change in Hardness | Loss Factor | Visual Rank | Change in pH | $\Delta\sigma$ | $\Delta v$ |
|---|---|---|---|---|---|---|---|
| A | Butyl blend | 8 | 1.01 | 10 | 1.04 | −3.3 | 0.04 |
| C | Epichlor-hydrin | 5 | 13.5 | 1 | −3.32 | −7.5 | 0.16 |
| D | polyacrylic | 21 | 55.5 | 9 | 3.16 | −4 | 0.11 |
| E | Nitrile (MRC) | −1 | 6.7 | 4 | 2.23 | −1.1 | 0.06 |
| F | Fluorocarbon | −2 | 2.4 | 5 | 2.75 | −0.6 | 0.04 |
| G | EPDM (MRC) | 1 | 1.13 | 5 | 0.04 | −5.5 | 0.07 |
| I | Neoprene | 3 | 0.65 | 8 | −4.08 | −5.6 | 0.10 |
| J | Hypalon | 8 | 1.1 | 10 | −3.6 | −8.8 | 0.06 |
| L | Nitrile (KR) | 5 | 5.19 | 5 | −0.3 | −10.8 | 0.07 |
| Q | EPDM | 2 | 0.65 | 1 | 0.8 | 0.6 | 0.14 |

From the foregoing results, five materials that appeared the most promising were selected for further testing. These were as follows:

| Sample Code | Description |
|---|---|
| E | commercial nitrile |
| G | commercial EPDM |
| I | commercial neoprene |
| L | commercial nitrile |
| Q | EPDM of the invention. |

A series of tests were performed. The results of these tests are set forth below.

1. Ambient temperature water absorption. In this test, samples were immersed in water for 168 hours, and the percent increase in water measured. The results are tabulated below. Lower water absorption is better. Sample Q was found to have the lowest water absorption:

| E | 0.463% |
|---|---|
| G | 0.859% |
| I | 0.417% |
| L | 0.963% |
| Q | 0.241%. |

2. Water vapor transmission rates. In this test, samples having wall thicknesses of about 0.045 to 0.050 inch were studied for transmission of water vapor over a period about one month (over 700 hours). The test was performed at ambient temperature and at 65° C. in one or three liquids: water/DEG (diethylene glycol) (95%/5%), water/DEG (50%50%), and deionized water. These are normalized values; lower numbers are preferred. Samples G, I, and Q were found to have the lowest water vapor transmission rates:

|   | water/DEG (95/5) | | water/DEG (50/50) | | water | |
|---|---|---|---|---|---|---|
|   | amb. | 65° C. | amb. | 65° C. | amb. | 65° C. |
| E | 0.24 | 7.0 | 0.21 | 7.3 | 0.275 | 8 |
| G | 0.018 | 0.80 | 0.010 | 0.92 | 0.027 | 0.92 |
| I | 0.035 | 0.73 | 0.027 | 0.91 | 0.035 | 0.75 |
| L | 0.33 | 9.35 | 0.25 | 8.7 | 0.31 | 12 |
| Q | 0.040 | 1.24 | 0.028 | 1.35 | 0.054 | 1.45 |

3. Compatibility testing was done in the most likely ink vehicle (95% water, 5% diethylene glycol). One of the key discriminating factors is surface tension of the soak vehicle after the test. A key physico/mechanical property of the elastomer is durometer. Changes in durometer, which is a measure of the penetration hardness of an elastomer, after the test (65° C. for 28 days) are summarized below.

|   | Surface Tension | Change in Durometer Following Soak |
|---|---|---|
| Nominal | 63.2 |   |
| E | 47.1 | −1 |
| G | 50.3 | 0 |
| I | 48.5 | −3 |
| L | 38.8 | +7 |
| Q | 56.9 | 0 |

From the foregoing tests, the nitrile rubbers are clearly not suitable. On the basis of the test of water weight gain after soak, the EPDM material, which was nearly twice as good as the next material, was selected for further testing.

EPDM with a fairly low cross-link density (Nordel 1040, available from DuPont de Nemours & Co., Wilmington, Del., having a published iodine number of 10) was found to evidence unacceptable variations in pressure as a function of volume of ink withdrawn from a bladder such as depicted in the Figure. The number of molecular bonds (bond density) was increased to provide a higher cross-link density. This was achieved by selecting an EPDM resin having a higher iodine number (Polysar 585, having an iodine number of 20). The resulting resin, when processed to form the elastomer of the invention, evidenced relatively minor variations pressure as a function of volume of ink withdrawn, and was determined to be acceptable under all conditions of the bladder (0° C., 35° C., 24 hour set in a dimpled configuration, 65 hour set in a dimpled configuration, and ink soak (one month immersion of the bladder in the ink at 65° C., removed from the ink, and then tested in a system configuration for comparison to the baseline performance).

EPDM resin available from Copolymer Rubber & Chemical, Baton Rouge, La., under the trade designation Epsyn 55 has an iodine number of 18 and is also suitably employed in the practice of the invention.

Thus, an elastomer for use with aqueous inks has been disclosed. It will be appreciated by those skilled in the art that various changes and modifications may be made without departing from the spirit and scope of the invention, and all such changes and modifications are considered to fall within the scope of the invention, as defined by the appended claims.

What is claimed is:

1. An elastomer resin composition consisting essentially of 100 parts high cross-link density ethylene propylene diene monomer having an iodine number of greater than 10, 18 to 30 parts carbon black as reinforcement, 7 to 7.5 parts dicumyl peroxide on Kaolin clay as curative, and 20 to 25 parts fully hydrogenated clay filtered mineral oil as plasticizer.

2. The elastomer of claim 1, wherein said monomer has an iodine number of at least about 18.

3. A back-pressure bladder for storing a quantity of ink for ink-jet printers, said bladder comprising an elastomer composition consisting essentially of 100 parts high cross-link density ethylene propylene diene monomer having an iodine number of greater than 10, 18 to 30 parts carbon black as reinforcement, 7 to 7.5 parts dicumyl peroxide on Kaolin clay as curative, and 20 to 25 parts fully hydrogenated clay filtered mineral oil as plasticizer.

4. The bladder of claim 3 wherein said monomer has an iodine number of at least about 18.

5. A gasket for use in sealing against leakage of ink in ink-jet printers comprising an elastomer composition consisting essentially of 100 parts high cross-link density ethylene propylene diene monomer having an iodine number of greater than 10, 18 to 30 parts carbon black as reinforcement, 7 to 7.5 parts dicumyl peroxide on Kaolin clay as curative, and 20 and 25 parts fully hydrogenated clay filtered mineral oil as plasticizer.

6. The gasket of claim 5 wherein said monomer has an iodine number of at least about 18.

* * * * *